(12) United States Patent
Jones et al.

(10) Patent No.: US 11,113,868 B2
(45) Date of Patent: Sep. 7, 2021

(54) RASTERED VOLUME RENDERER AND MANIPULATOR

(71) Applicant: Intuitive Research and Technology Corporation, Huntsville, AL (US)

(72) Inventors: Michael Jones, Athens, AL (US);
Chanler Crowe, Madison, AL (US);
Kyle Russell, Huntsville, AL (US);
Michael Yohe, Meridianville, AL (US)

(73) Assignee: INTUITIVE RESEARCH AND TECHNOLOGY CORPORATION, Huntsville, AL (US)

( * ) Notice: Subject to any disclaimer, the term of this patent is extended or adjusted under 35 U.S.C. 154(b) by 56 days.

(21) Appl. No.: 16/703,012

(22) Filed: Dec. 4, 2019

(65) Prior Publication Data

US 2020/0175742 A1  Jun. 4, 2020

Related U.S. Application Data

(60) Provisional application No. 62/774,965, filed on Dec. 4, 2018.

(51) Int. Cl.
*G06T 15/06* (2011.01)
*G06T 7/90* (2017.01)
*G06T 19/20* (2011.01)

(52) U.S. Cl.
CPC .......... *G06T 15/06* (2013.01); *G06T 7/90* (2017.01); *G06T 19/20* (2013.01); *G06T 2210/62* (2013.01); *G06T 2219/2012* (2013.01)

(58) Field of Classification Search
CPC .......... G06T 15/08; G06T 15/06; G06T 15/80
See application file for complete search history.

(56) References Cited

U.S. PATENT DOCUMENTS

| | | |
|---|---|---|
| 6,892,090 B2 | 5/2005 | Verard et al. |
| 6,947,039 B2 | 9/2005 | Gerritsen et al. |
| 7,894,663 B2 | 2/2011 | Berg et al. |
| 8,696,549 B2 | 4/2014 | Noising et al. |
| 9,105,127 B2 | 8/2015 | Choi |
| 9,202,007 B2 | 12/2015 | Noordvyk et al. |
| 9,684,997 B2 | 6/2017 | Angelidis et al. |
| 10,165,928 B2 | 1/2019 | Hunter et al. |
| 10,178,366 B2 | 1/2019 | Lucas |
| 2014/0015834 A1* | 1/2014 | Kho ............... G06T 15/08 345/426 |

* cited by examiner

*Primary Examiner* — Chong Wu

(74) *Attorney, Agent, or Firm* — Angela Holt; Frank M. Caprio; Bradley Arant Boult Cummings LLP

(57) ABSTRACT

A method for visualizing two-dimensional data with three-dimensional volume enables the end user to easily view abnormalities in sequential data. The two-dimensional data can be in the form of a tiled texture with the images in a set row and column, a media file with the images displayed at certain images in time, or any other way to depict a set of two-dimensional images. The disclosed method takes in each pixel of the images and evaluates the density, usually represented by color, of the pixel. This evaluation allows the user to set threshold values and return accurate representations of the data presented, instead of a culmination of all data along a ray trace.

11 Claims, 6 Drawing Sheets

RASTERED VOLUME RENDERER AND MANIPULATOR

REFERENCE TO RELATED APPLICATIONS

This application claims priority to Provisional Patent Application U.S. Ser. No. 62/774,965, entitled "Rastered Volume Renderer and Manipulator" and filed on Dec. 4, 2018, which is fully incorporated herein by reference.

BACKGROUND AND SUMMARY

Conventional methods for viewing sequential two-dimensional data require the user to flip through each image. The user must remember where he or she is in the series of slides relative to the model from which the slides were taken. This limits the user's ability to view the overall picture.

An example of this is the traditional method of viewing medical DICOM (Digital Imaging and Communications in Medicine) images. DICOM images are loaded sequentially into software that allows the user to scroll through using a mouse or keyboard. This method allows for the images to be displayed as only two-dimensional data and many packages display only a single image at a time.

An exemplary method of this kind is known from the blog Shader Bits (https://shaderbits.com/blog/ray-marched-heightmaps). The Shader Bits algorithm produces a volumetric mesh of a cloud using tiled noise textures, a two-dimensional image consisting of multiple images divided into rows and columns, coupled with the density value returned when a virtual ray is traced along an arbitrary vector through the volume representing the space where the cloud is located.

The present disclosure provides a method to visualize two-dimensional data with three-dimensional volume enabling the end user to easily view abnormalities in sequential data. By adapting the algorithm described above, the current software, unlike the prior art, is not concerned with the density from the view of the camera. Instead the current algorithm focuses on the density of the two-dimensional texture array. This two-dimensional texture array can be in the form of a tiled texture with the images in a set row and column, a media file with the images displayed at certain images in time, or any other way to depict a set of two-dimensional images. The disclosed method takes in each pixel of the images and evaluates the density, usually represented by color, of the pixel. This evaluation allows the user to set threshold values and return exact representations of the data presented, instead of a culmination of all data along a ray trace.

For example, medical images consist of bone and soft tissue that are different colors. This will provide the user to create a threshold value or setting range of values to determine how the data is presented, which will allow medical professionals to look for abnormalities, such as: fractures, scarring, or tumors.

Since the user has simultaneous access to the two-dimensional tiles while viewing the three-dimensional volume, the user can manipulate the rendered volumetric mesh by adjusting the original tiled texture or texture sequence. This provides the user the ability, which is lacking under current methods, to know where he or she is in the three-dimensional plane when given two-dimensional images

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

In some embodiments of the present disclosure, the operator may use a virtual controller or other input device to manipulate three-dimensional mesh. As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds.

Figure 1:
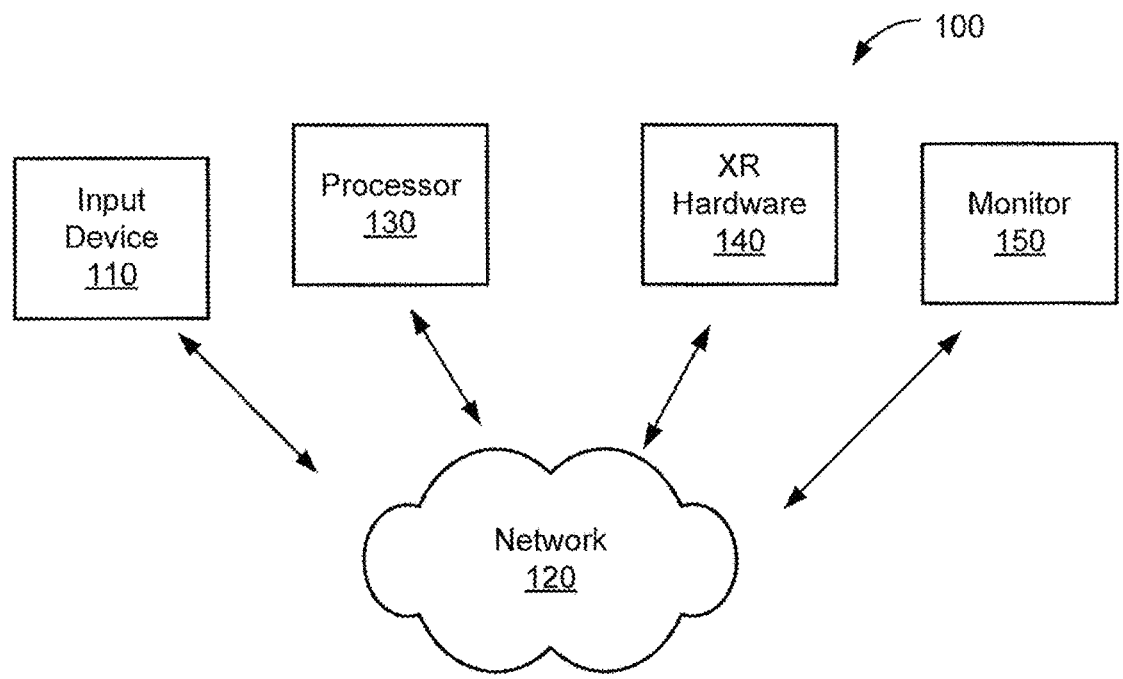
FIG. 1 depicts a system for visualizing sequential two-dimensional data referenced to a three-dimensional model according to an exemplary embodiment of the present disclosure.

FIG. 1 depicts a system 100 for visualizing sequential two-dimensional data referenced to three-dimensional model, according to an exemplary embodiment of the present disclosure. The system 100 comprises an input device 110 communicating across a network 120 to a processor 130. The input device 110 may comprise, for example, a keyboard, a switch, a mouse, a joystick, a touch pad and/or other type of interface, which can be used to input data from a user (not shown) of the system 100. The network 120 may be a combination of hardware, software, or both. The system 100 further comprises XR hardware 140, which may be virtual or mixed reality hardware that can be used to visualize a three-dimensional world. The system 100 further comprises a video monitor 150 is used to display the three-dimensional data to the user. In operation of the system 100, the input device 110 receives input from the processor 130 and translates that input into an XR event or function call. The input device 110 allows a user to input data to the system 100, by translating user commands into computer commands.

Figure 2:
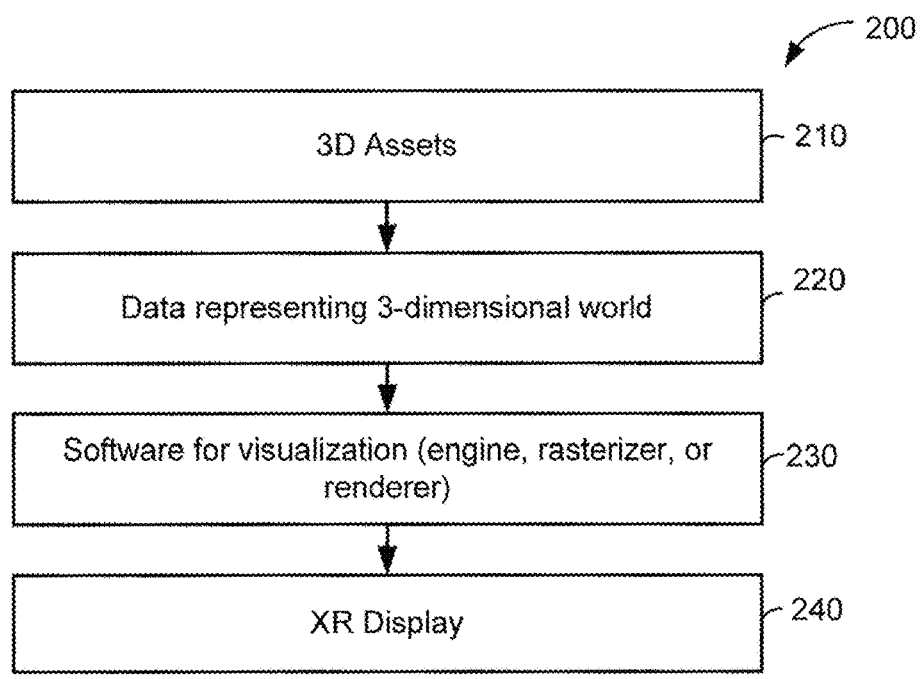
FIG. 2 is a flow diagram depicting a method for representing data in three-dimensional images, according to one embodiment of the present disclosure.

FIG. 2 illustrates the relationship between three-dimensional assets 210, the data representing those assets 220, and the communication between that data and the software, which leads to the representation on the XR platform. The three-dimensional assets 210 may be any three-dimensional assets, which are any set of points that define geometry in three-dimensional space.

The data representing a three-dimensional world 220 is a procedural mesh that may be generated by importing three-dimensional models, images representing two-dimensional data, or other data converted into a three-dimensional format. The software for visualization 230 of the data representing a three-dimensional world 220 allows for the processor 130 (FIG. 1) to facilitate the visualization of the data representing a three-dimensional world 220 to be depicted as three-dimensional assets 210 in the XR display 240.

Figure 3:
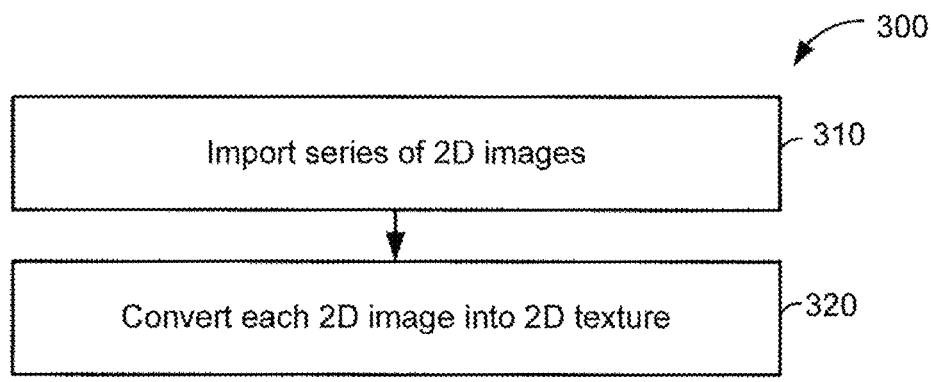
FIG. 3 is a flow diagram depicting a method for importing two-dimensional data.

FIG. 3 depicts a method 300 of data importation and manipulation performed by the system, according to an exemplary embodiment of the present disclosure. In step 310 of the method 300, a series of two-dimensional images is imported. In this regard, a user uploads the series of two-dimensional images that will later be converted into a three-dimensional mesh. The importation step 310 can be done through a GUI interface, copying the files into a designated folder, or other methods. In step 320, each of the two-dimensional images are converted into a two-dimensional texture that can be manipulated by the program.

Figure 4:
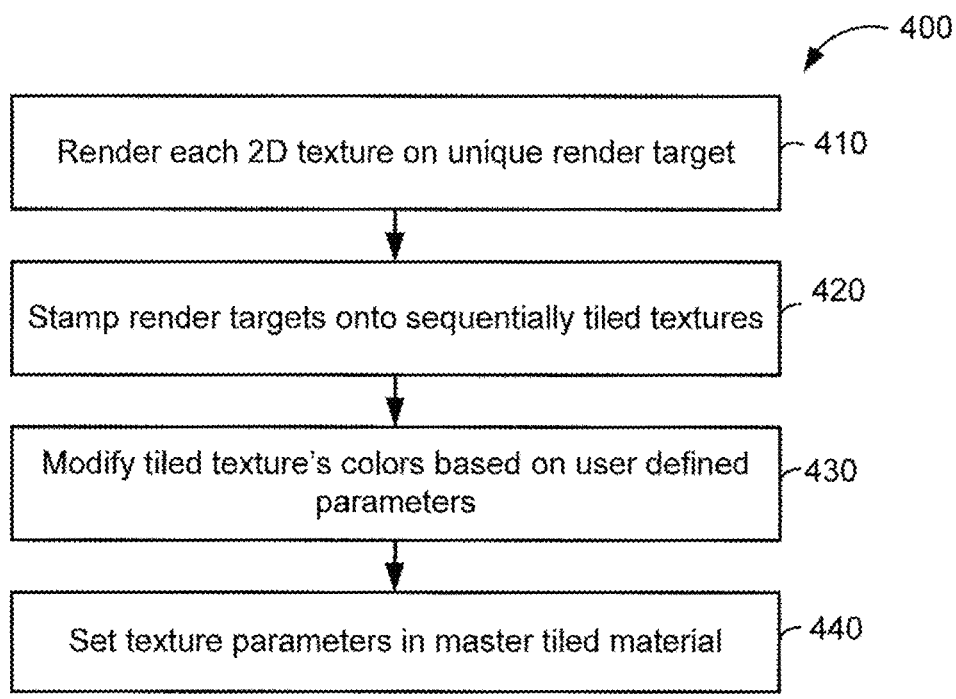
FIG. 4 is a flow diagram depicting a method for creating three-dimensional data from two-dimensional data.

FIG. 4 depicts a method 400 of importing data for manipulation, according to one embodiment of the present disclosure. In step 410, each converted two-dimensional texture is rendered onto a render target. A render target is essentially a texture that is written to at runtime. Render targets store information such as base color. Also in this step, the two-dimensional texture is resized to a size set by the user.

In step 420, the resized two-dimensional texture is added to the tiled texture. This process is done sequentially such that each texture has its own tile. These textures are drawn onto a larger texture in a grid pattern, in order of height. When used herein, the term "height" refers to the distance between two sequential two-dimensional textures, i.e., the distance between images for which there is no image information. This creates a grid of sequential images. Each grid texture is then ordered in sequence by height as well. These grid textures are then referenced to create a stacked image volume.

In step 430, the colors of the tiled texture are modified based on user-defined parameters 430. In this step, the software goes through the pixels to determine whether the pixel color value meets the defined user parameters, which will signal the software to manipulate the pixel by coloring those that do meet the pixel color value and leaving those that do not meet the pixel color value invisible. For example, a health care professional may be interested in viewing only bone, and by selecting the desired color parameters, only bone would be visible in the images.

In an exemplary embodiment the user may select a desired upper color threshold, a desired lower color threshold, and a desired brightness. The color thresholds are associated with the density of the materials desired to be viewed.

In step 440, the texture parameters are set in the master tiled material. Thereafter when the system "looks" for pixels, it will use these textures. Shaders in the software manipulate the grid textures so all the tiles show what is desired by cutting out pixels. The manipulation can be done on either a tile by tile basis, or on a "full grid," basis, by manipulating all of the tiles within a grid at once. The result of the manipulation is rendered/drawn onto a final texture that will be read by runtime volumetric shaders.

Figure 5:
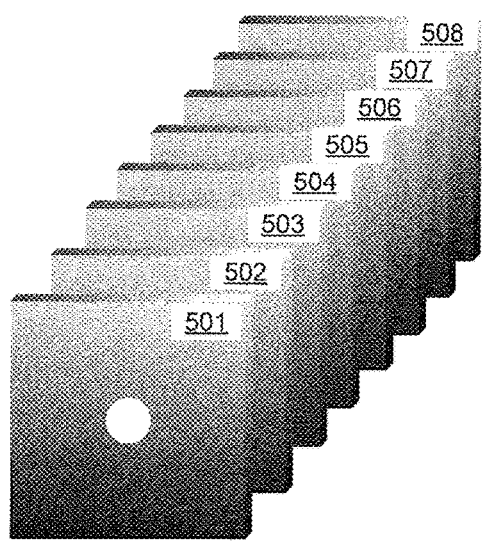
FIG. 5 depicts a series of two-dimensional textures created by the method disclosed herein.
Figure 6:
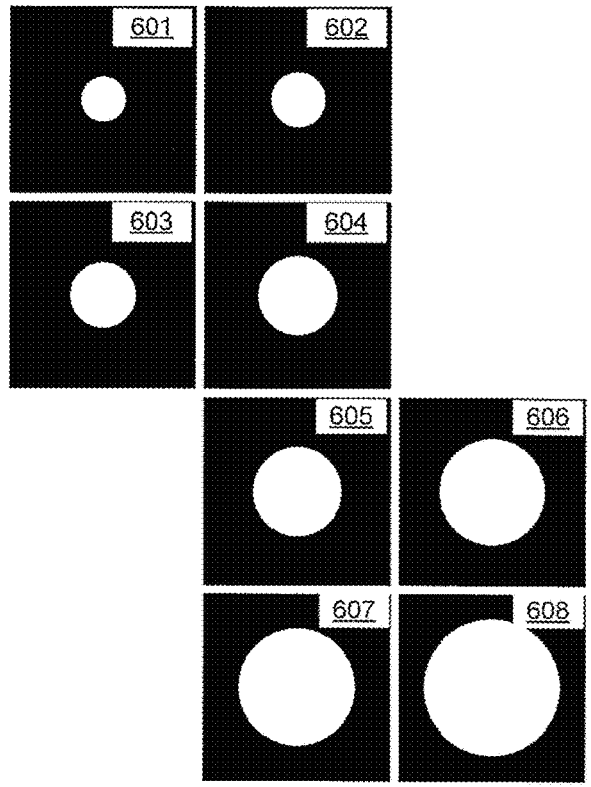
FIG. 6 depicts a grid of rows and columns of tiled textures.

FIG. 5 depicts a series of two-dimensional textures 501-508 after step 410 of the method 400, and FIG. 6 depicts a grid of rows and columns of tiled textures 601-608 after step 420 of the method 400. Tiled textures 601-604 represent a first "flip book" of textures and tiled textures 605-608 represent a second "flip book" of textures. The shader that reads textures samples between two consecutive flip books of textures and blends between them.

Figure 7:
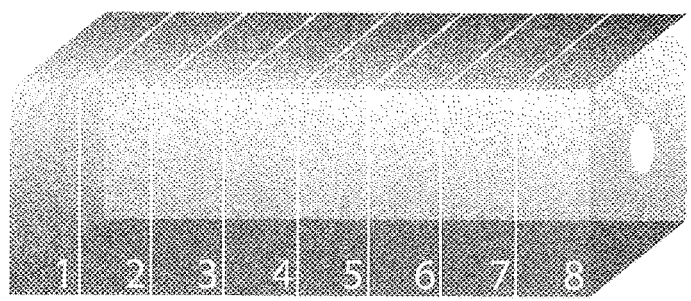
FIG. 7 represents a final layout of the images in sequential order with the new depth dimension extruded and blended between them.

FIG. 7 represents the final layout of the images in sequential order with the new depth dimension extruded and blended between them.

Figure 8:
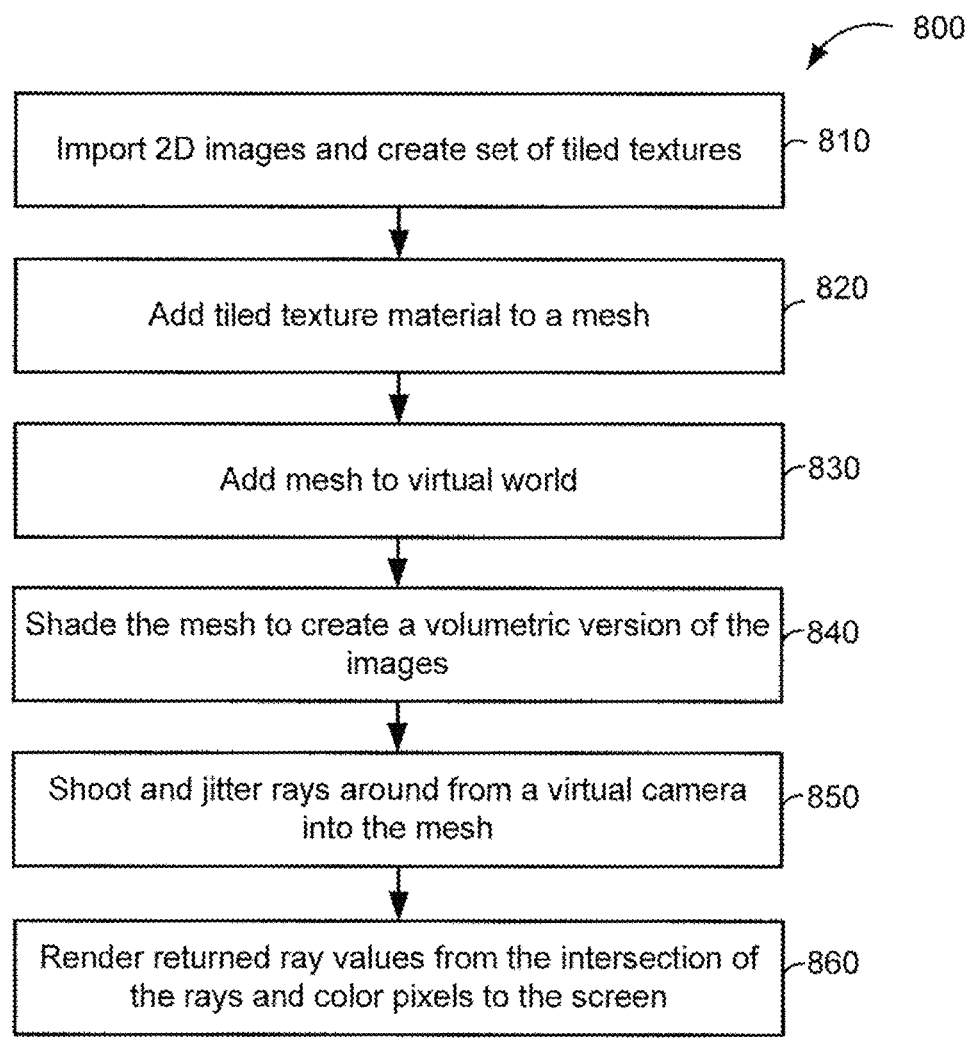
FIG. 8 is flow diagram depicting a method for creating a three-dimensional mesh based on the series of 2D images.

FIG. 8 depicts a method 800 of creating a three-dimensional mesh based on a series of two-dimensional images. In step 810, the software imports the designated images and creates the master material, as depicted in 300 (FIG. 3) and 400 (FIG. 4). In step 820, the master material is applied to a mesh. In step 830, the mesh is added to the virtual world. In step 840, the mesh is shaded to create a volumetric version of the images. In this step, the software virtually slices the mesh volume into equal parts based on the user's desired resolution.

In step 850, a virtual camera virtually projects arbitrary rays into the mesh volume from a face of the virtual camera. The volume is rendered by selecting and jittering raster rays with an origin at the camera location. These rays are randomly selected and are oriented away from the camera. The rays are then "marched" along, and at each step the rays take, a determination is made based on the ray's z-axis position which tile in which tile set should be sampled for color and opacity. The rays are marched along until one of two conditions are met: either a) they collide with a pixel in one of the images that has color, or b) they exit out of the back of the texture without hitting anything, implying that area was empty. The pixel that is returned is then rendered in its full opacity. If no color is returned, nothing is rendered.

In an alternative implementation, pixel opacity can be altered to any value between fully transparent and fully opaque, as an interpolative value between 0 and 1.

In step 860, the virtually-returned rays determine the rendered information. In this regard, the pixels on the screen are colored based upon the returned results from the rays. The returned results of the rays are based on the tiled texture that makes up the virtual space in front of the rays.

Since each of the tiles or images has its own section of the mesh, if the ray hits that space, the software examines the tile for rendering determinations. Each tile has its own space in the virtual mesh. The software uses the information from the previous slice to fill the volumetric representation until the next slice is reached. Alternately, if the user has blending enabled, the shader bilinearly filters between the texture of the previous slice and the texture of the next slice.

Figure 9:
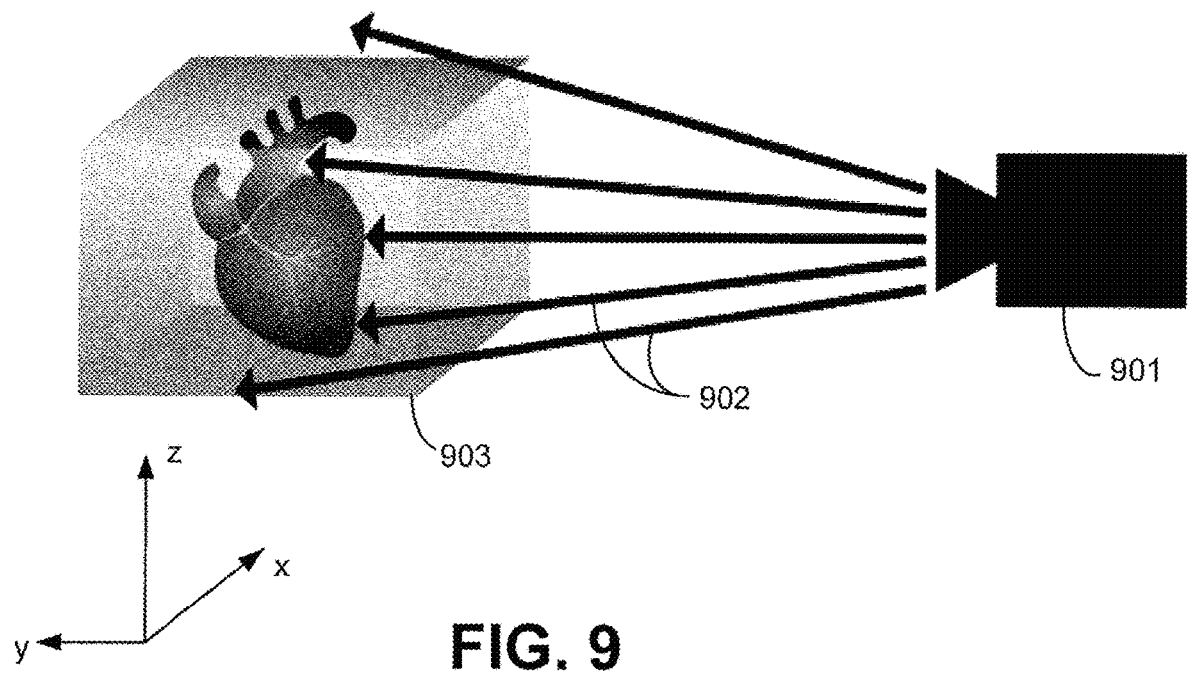
FIG. 9 depicts a virtual camera projecting raster rays into a mesh volume.
Figure 10:
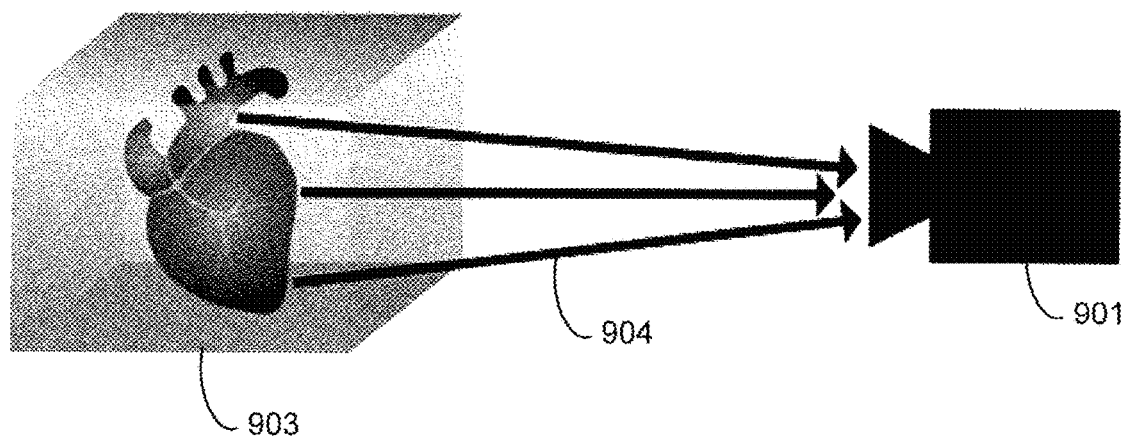
FIG. 10 depicts returned rays from the mesh volume.

FIG. 9 depicts step 850 of FIG. 8, showing a virtual camera 901 virtually projecting rays 902 into a mesh volume 903. FIG. 10 depicts step 860 of FIG. 8, showing returned rays 904 virtually returned from the mesh volume 903. The returned result of the ray is the color and opacity of the pixel the ray encountered. Wherever an arrow head in FIG. 9 ends, that represents the location where a ray encountered a pixel that actually had a color, meaning something was there. The color and opacity found is what is returned in FIG. 10.

Figure 11:
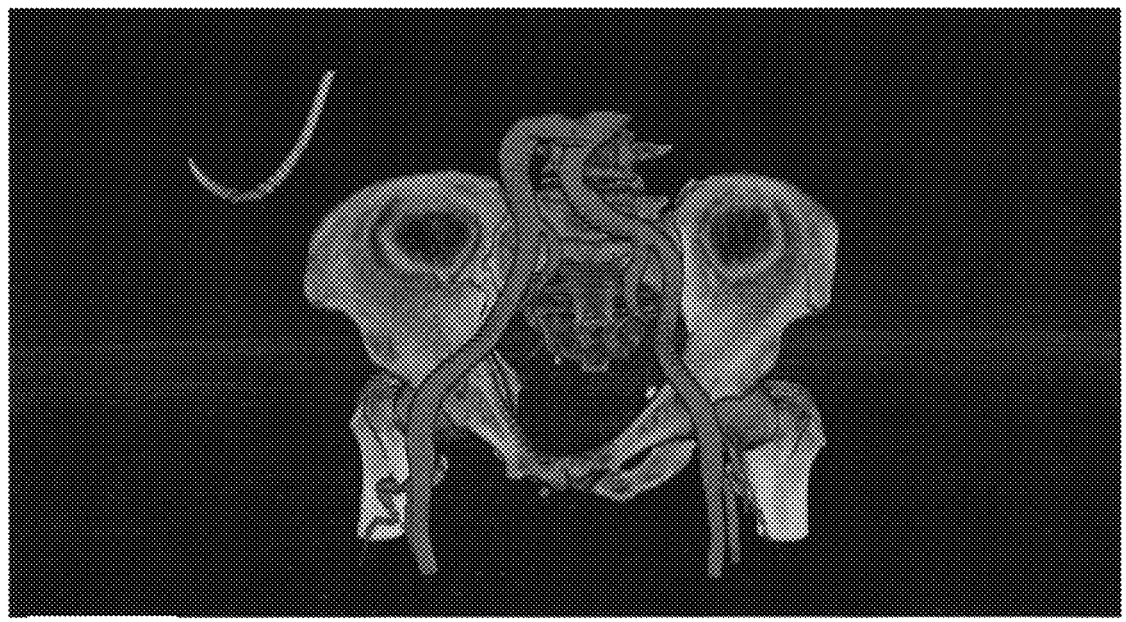
FIG. 11 depicts a three-dimensional representation created using the methods disclosed herein.
Figure 12:
FIG. 12 is a rotated view of the representation of FIG. 11.

FIG. 11 depicts a three-dimensional representation created using the methods disclosed herein. FIG. 12 is a rotated view of the representation of FIG. 10.

What is claimed is:

1. A method for displaying sequential two-dimensional data referenced to a three-dimensional representation, the method comprising:

converting two-dimensional images into two-dimensional image textures;

rendering the two-dimensional image textures onto render targets;

stamping the render targets onto sequentially tiled textures;

modifying the colors of each tiled texture based on user-defined parameters; and setting texture parameters in master tiled material and adding the master tiled material to a mesh;

virtually projecting arbitrary rays into the mesh from a face of a virtual camera and displaying, on a display, returned ray values from an intersection of the arbitrary rays with color pixels from the mesh.

2. The method of claim 1, wherein the step of virtually projecting arbitrary rays into the mesh from a face of a virtual camera and displaying, on a display, returned ray values from an intersection of the arbitrary rays with color pixels from the mesh further comprises determining, based on the rays' z-axis positions, a tile from a tile set to be sampled for color and opacity.

3. The method of claim 2, further comprising marching the rays along in fixed-step increments.

4. The method of claim 3, further comprising creating a user view that allows the user to view only information returned from user-determined thresholds.

5. The method of claim 1, wherein the returned ray values are displayed on the display in full opacity, and wherein where no color is returned on a returned ray, nothing is rendered on the display.

6. The method of claim 1, wherein the returned ray values are displayed on the display at a user-defined opacity between fully transparent and fully opaque.

7. The method of claim 1, wherein each tiled texture comprises a section of the mesh, and the spaces between each tiled texture are blended.

8. The method of claim 1, wherein the step of stamping render targets onto sequentially tiled textures further comprises drawing images onto a larger texture in a grid pattern, in order of height, creating a grid of sequential images.

9. The method of claim 8, wherein the step of stamping render targets onto sequentially tiled textures further comprises referring the grid of sequential images to create a stacked image volume.

10. The method of claim 1, wherein the step of stamping render targets onto sequentially tiled textures further comprises creating a sequence of grids ordered by height, to create a stacked image volume.

11. The method of claim 1, wherein the step of modifying the colors of each tiled texture based on user-defined parameters further comprises determining, for each pixel, whether a pixel color value is within a user-defined color range and coloring the pixels that are within the user-defined color range and leaving the pixels that are not within the user-defined color range invisible.

* * * * *